(12) United States Patent
Traversa

(10) Patent No.: US 12,373,680 B2
(45) Date of Patent: Jul. 29, 2025

(54) DEEP NEURAL NETWORK WITH MULTIPLE LAYERS FORMED OF MULTI-TERMINAL LOGIC GATES

(71) Applicant: MemComputing, Inc., San Diego, CA (US)

(72) Inventor: Fabio Lorenzo Traversa, San Diego, CA (US)

(73) Assignee: MemComputing, Inc., San Diego, CA (US)

( * ) Notice: Subject to any disclaimer, the term of this patent is extended or adjusted under 35 U.S.C. 154(b) by 257 days.

(21) Appl. No.: 18/313,187

(22) Filed: May 5, 2023

(65) Prior Publication Data

US 2023/0359875 A1    Nov. 9, 2023

Related U.S. Application Data

(60) Provisional application No. 63/364,405, filed on May 9, 2022.

(51) Int. Cl.
*G06N 3/063* (2023.01)

(52) U.S. Cl.
CPC .................... *G06N 3/063* (2013.01)

(58) Field of Classification Search
CPC ............... G06N 3/063; G06N 3/065
See application file for complete search history.

(56) References Cited

U.S. PATENT DOCUMENTS

| | | | |
|---|---|---|---|
| 4,660,166 A | 4/1987 | Hopfield | |
| 9,570,140 B2 | 2/2017 | Di Ventra et al. | |
| 9,911,080 B2 | 3/2018 | Di Ventra et al. | |
| 2009/0138419 A1 | 5/2009 | Nugent | |
| 2014/0180989 A1 | 6/2014 | Krizhevsky et al. | |
| 2017/0316309 A1* | 11/2017 | Di Ventra | G06N 3/08 |
| 2018/0144239 A1 | 5/2018 | Di Ventra et al. | |
| 2019/0164046 A1* | 5/2019 | Song | G11C 11/54 |

(Continued)

FOREIGN PATENT DOCUMENTS

| | | | | |
|---|---|---|---|---|
| WO | WO-2022100827 A1 * | 5/2022 | | G06N 3/048 |
| WO | WO-2023143707 A1 * | 8/2023 | | G06N 3/043 |

OTHER PUBLICATIONS

Di Ventra, Massimiliano. "MemComputing vs. Quantum Computing: some analogies and major differences." 2022 IEEE 22nd International Conference on Nanotechnology (NANO). IEEE, 2022.

(Continued)

*Primary Examiner* — Seokjin Kim
(74) *Attorney, Agent, or Firm* — Knobbe, Martens, Olson & Bear, LLP

(57) ABSTRACT

A deep neural network circuit with multiple layers formed of multi-terminal logic gates is provided. In one aspect, the neural network circuit includes a plurality of logic gates arranged into a plurality of layers and a plurality of logical connectors arranged between each pair of adjacent layers. Each of the logical connectors connects the output of a first logic gate to the input of a second logic gate and each of the logical connectors has one of a plurality of different logical connector states. The neural network circuit is configured to be trained to implement a function by finding a set of the logical connector states for the logical connectors such that the neural network circuit implements the function.

20 Claims, 8 Drawing Sheets

(56) References Cited

U.S. PATENT DOCUMENTS

2020/0293855 A1\* 9/2020 Le Gallo-Bourdeau ............... G06N 3/084
2020/0327406 A1\* 10/2020 Piveteau ................. G06N 3/08

OTHER PUBLICATIONS

Caravelli, Francesco, Forrest C. Sheldon, and Fabio L. Traversa. "Global minimization via classical tunneling assisted by collective force field formation." Science Advances 7.52 (2021): eabh1542.
Zhang, Yuan-Hang, and Massimiliano Di Ventra. "Directed percolation and numerical stability of simulations of digital memcomputing machines." Chaos: An Interdisciplinary Journal of Nonlinear Science 31.6 (2021).
Bonnin, Michele, Fabio Lorenzo Traversa, and Fabrizio Bonani. "Coupled oscillator networks for von Neumann and non-von Neumann computing." Advances in Artificial Intelligence-based Technologies: Selected Papers in Honour of Professor Nikolaos G. Bourbakis—vol. 1 (2022): 179-207.
Bearden, Sean RB, Yan Ru Pei, and Massimiliano Di Ventra. "Efficient solution of Boolean satisfiability problems with digital memcomputing." Scientific reports 10.1 (2020): 19741.
Manukian, Haik, et al. "Mode-assisted unsupervised learning of restricted Boltzmann machines." Communications Physics 3.1 (2020): 105.
Traversa, Fabio L. "Aircraft loading optimization: Memcomputing the 5th airbus problem." arXiv preprint arXiv:1903.08189 (2019).
Di Ventra, Massimiliano, and Igor V. Ovchinnikov. "Digital memcomputing: from logic to dynamics to topology." Annals of Physics 409 (2019): 167935.
Sheldon, Forrest, Fabio L. Traversa, and Massimiliano Di Ventra. "Taming a non-convex landscape with dynamical long-range order: memcomputing the ising spin-glass." arXiv preprint arXiv:1810.03712 (2018).
Traversa, Fabio L., and Massimiliano Di Ventra. "Memcomputing integer linear programming." arXiv preprint arXiv:1808.09999 (2018).
Sheldon, Forrest, et al. "Stress-testing memcomputing on hard combinatorial optimization problems." IEEE transactions on neural networks and learning systems 31.6 (2019): 2222-2226.
Di Ventra, Massimiliano, and Fabio L. Traversa. "Memcomputing: Leveraging memory and physics to compute efficiently." Bulletin of the American Physical Society 64 (2019).
Manukian, Haik, Fabio L. Traversa, and Massimiliano Di Ventra. "Accelerating deep learning with memcomputing." Neural Networks 110 (2019): 1-7.
Pei, Yan Ru, Fabio L. Traversa, and Massimiliano Di Ventra. "On the universality of memcomputing machines." IEEE Transactions on Neural Networks and Learning Systems 30.6 (2018): 1610-1620.
Traversa, Fabio L., et al. "Evidence of exponential speed-up in the solution of hard optimization problems." Complexity 2018 (2018).
Di Ventra, Massimiliano, and Fabio L. Traversa. "Absence of periodic orbits in digital memcomputing machines with solutions." Chaos: An Interdisciplinary Journal of Nonlinear Science 27.10 (2017).
Bearden, Sean RB, et al. "Instantons in self-organizing logic gates." Physical Review Applied 9.3 (2018): 034029.
Di Ventra, Massimiliano, and Fabio L. Traversa. "Absence of chaos in digital memcomputing machines with solutions." Physics Letters A 381.38 (2017): 3255-3257.
Manukian, Haik, Fabio L. Traversa, and Massimiliano Di Ventra. "Memcomputing numerical inversion with self-organizing logic gates." IEEE Transactions on Neural Networks and Learning Systems 29.6 (2017): 2645-2650.
Di Ventra, Massimiliano, Fabio L. Traversa, and Igor V. Ovchinnikov. "Topological field theory and computing with instantons." Annalen der Physik 529.12 (2017): 1700123.
Traversa, Fabio L., and Massimiliano Di Ventra. "Polynomial-time solution of prime factorization and NP-complete problems with digital memcomputing machines." Chaos: An Interdisciplinary Journal of Nonlinear Science 27.2 (2017).
Di Ventra, Massimiliano, et al. "Dynamic computing random access memory: A brain-inspired computing paradigm with memelements." 2014 IEEE International Symposium on Circuits and Systems (ISCAS). IEEE, 2014.
Traversa, Fabio Lorenzo, and Massimiliano Di Ventra. "Universal memcomputing machines." IEEE transactions on neural networks and learning systems 26.11 (2015): 2702-2715.
Traversa, Fabio L., et al. "Dynamic computing random access memory." Nanotechnology 25.28 (2014): 285201.
International Search Report and Written Opinion received in Application No. PCT/US2023/021187 mailed Jul. 31, 2023.

\* cited by examiner

DEEP NEURAL NETWORK WITH MULTIPLE LAYERS FORMED OF MULTI-TERMINAL LOGIC GATES

CROSS REFERENCE TO ANY PRIORITY APPLICATIONS

Any and all applications for which a foreign or domestic priority claim is identified in the Application Data Sheet as filed with the present application are hereby incorporated by reference under 37 CFR 1.57. The present application claims the benefit of priority of U.S. Provisional Patent Application No. 63/364,405, filed May 9, 2022 and titled "DEEP NEURAL NETWORK WITH MULTIPLE LAYERS FORMED OF MULTI-TERMINAL LOGIC GATES," the disclosure of which is hereby incorporated in its entirety and for all purposes.

BACKGROUND

Technical Field

The present disclosure relates generally to neural networks. More particularly, the present disclosure is related to deep neural networks which are implemented using multiple layers formed of multi-terminal logic gates.

Description of the Related Technology

Neural networks can be implemented on various types of hardware such as central processing units (CPUs) and field programmable gate arrays (FPGAs) as well as specialty hardware designed for neural networks, such as distributed architectures like graphics processing units (GPUs) or tensor processing units (TPUs).

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One inventive aspect is a neural network circuit, comprising: a plurality of logic gates arranged into a plurality of layers, each of the logic gates having a plurality of inputs and an output; and a plurality of logical connectors arranged between each pair of adjacent layers, each of the logical connectors determining a relationship between the output of a first logic gate to one of the plurality of inputs of a second logic gate, and each of the logical connectors having one of a plurality of different logical connector states, wherein the neural network circuit is configured to be trained to implement a function by finding a set of the logical connector states for the logical connectors such that the neural network circuit implements the function.

In some embodiments, the logical connector states include a first state in which the output of the first logic gate is connected to the input of the second logic gate via a NOT gate and a second state in which the output of the first logic gate is connected to the input of the second logic gate via a short circuit.

In some embodiments, the logical connector states further include a third state in which the output of the first logic gate is connected to the input of the second logic gate via an open circuit.

In some embodiments, the logic gates and the logical connectors are implemented in complementary metal-oxide semiconductor (CMOS) technology.

In some embodiments, the neural network circuit is formed on a single chip.

In some embodiments, each of the logical connectors comprises: an input; a short circuit connected to the input; an inverter arranged in parallel with the short circuit and connected to the input; an output; and at least one switch configured to connect one of the short circuit and the inverter to the output.

In some embodiments, each of the logical connectors further comprises: an open circuit connected to the input, wherein the at least one switch configured to connect one of the short circuit, the inverter, and the open circuit to the output.

In some embodiments, the at least one switch comprises a first switch and a second switch connected in series, the first switch is configured to electrically connect to one of the short circuit and the inverter, and the second switch is configured to operate in either an open circuit or short circuit state.

In some embodiments, each of the logical connectors comprises at least one of a short circuit or an inverter, and each of the logical connectors connects an output of a logic gate of a previous layer to an input of a logic gate of a current layer.

In some embodiments, each of the logic gates comprises a multi-terminal NOR gate.

In some embodiments, the neural network further comprises a training circuit configured to produce the set of the logical connector states.

In some embodiments, each of the logical connectors has a fixed one of the logical connector states.

In some embodiments, each of the logical connectors comprises a single one of: a short circuit, an inverter, and an open circuit corresponding to the fixed one of the logical connector states.

Another aspect is a method of computing a function using a neural network circuit, comprising: providing a neural network circuit including: a plurality of logic gates arranged into a plurality of layers, each of the logic gates having a plurality of inputs and an output; and a plurality of logical connectors comprising sets of logical connectors arranged between each pair of adjacent layers, each of the logical connectors having one of a plurality of different logical connector states, wherein the plurality of logical connectors are programmed to implement a function; and computing the function for an input signal using the neural network.

In some embodiments, the method further comprises: finding a set of the logical connector states for the plurality of logical connectors such that the neural network circuit implements the function.

In some embodiments, the method further comprises: generating a set of integer linear programming (ILP) problems based on the function; and solving the set of ILP problems to produce the set of the logical connector states.

In some embodiments, the method further comprises: determining a set of inequalities that describe the states of the logical connectors; and linking outputs from a previous layer to inputs of a subsequent layer through the set of inequalities, wherein the generating of the ILP problems is based on the linking of the outputs from the previous layer to the inputs of the subsequent layer through the set of inequalities.

In some embodiments, the logical connector states include a first state in which the output of the first logic gate is connected to the input of the second logic gate via a NOT gate and a second state in which the output of the first logic gate is connected to the input of the second logic gate via a short circuit.

Yet another aspect is a single chip, comprising: a plurality of logic gates arranged into a plurality of layers of a neural network circuit, each of the logic gates having a plurality of inputs and an output; a plurality of logical connectors arranged between logic gates of each pair of adjacent layers, each of the logical connectors determining a relationship between the output of a first logic gate to one of the plurality of inputs of a second logic gate, and each of the logical connectors having one of a plurality of different logical connector states; a plurality of input terminals; and at least one output terminal, wherein the chip is configured to compute a function between the input terminals and the output terminal.

In some embodiments, the chip is configured to compute the function for a given input provided to the input terminals in ten clock cycles or fewer.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

DETAILED DESCRIPTION

Figure 1:
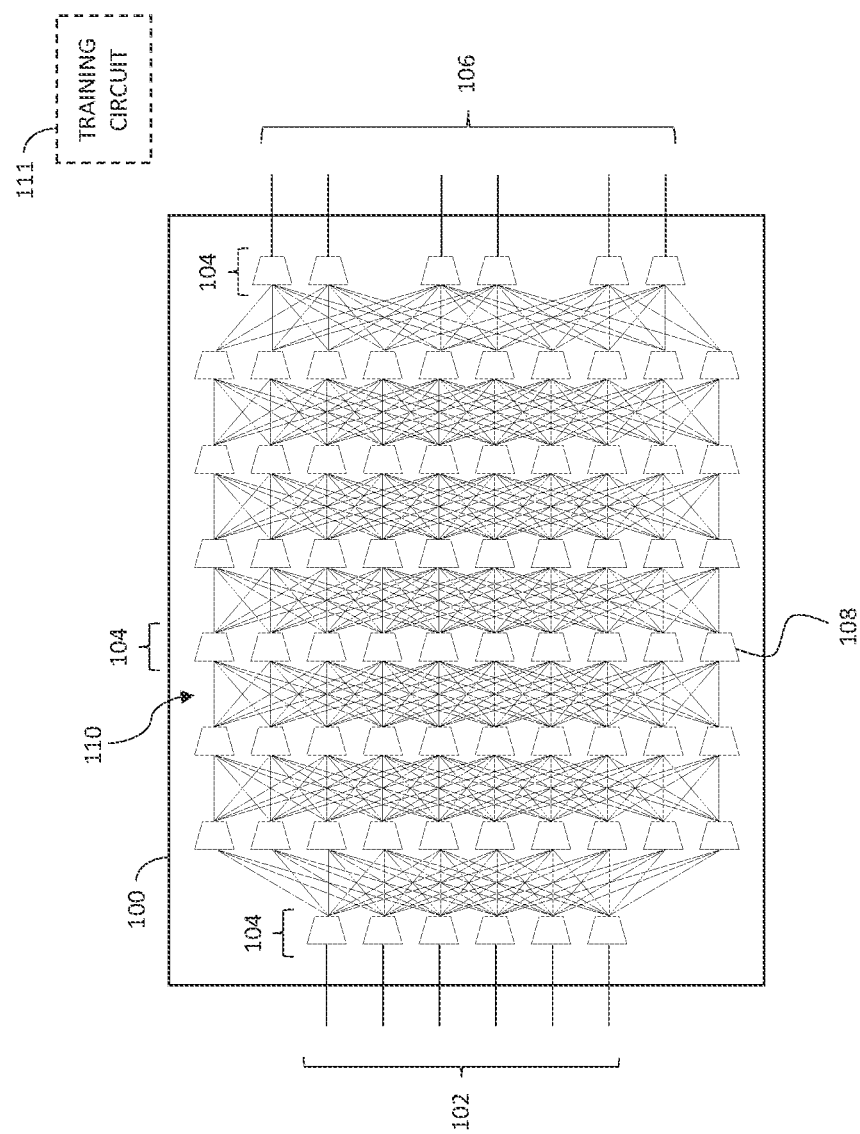
FIG. 1 is a circuit diagram illustrating a digital neural network in accordance with aspects of this disclosure.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

While current processor architectures are adequate for relatively small data sets, they may be incapable of accommodating the growing volume of information desired in real-time for certain computationally intensive applications. For example, vehicles can benefit greatly from more computing capacity to decipher incoming sensor data and rapidly make significant real-time decisions. Aspects of this disclosure relate to cost-effective and scalable computing systems and methods that can improve computing capacity for various applications, including to combat the future void in the vehicle data processing capabilities.

Current edge processors based on central processing units (CPUs), graphics processing units (GPUs), and field programmable gate arrays (FPGAs) cannot execute algorithms on certain large sensor data streams (such as those in vehicles) efficiently enough to meet certain computing goals. Data movement represents one of the most significant limitations in certain computing architectures. This limitation is called the von Neumann bottleneck, and it has two main implications: it limits computational throughput and involves considerable energy to move the data between memory and processing.

The growing adoption of machine learning and artificial intelligence (AI) technologies, such as neural networks, seek to improve processing capabilities for larger data sets and enable automation. However, in many cases, these techniques are still limited by their underlying von Neumann architectures. Specifically, there is the challenge of realizing ultra-low-power electronic architectures for real-time evaluation/inference of neural networks. This is still an unresolved issue for neural networks running on traditional hardware since the nonlinear (artificial neuron activation functions can be sigmoid, rectified linear unit (ReLU), etc.) and deep (several layers to be evaluated in sequence) nature of neural networks may involve an unavoidable sequence of calculations and therefore include several unavoidable clocks cycles even with the most advanced distributed architectures like GPUs or tensor processing units (TPUs). This translates in evaluation/inference time that is intolerably high for many applications (e.g., autonomous vehicles). Despite the effort on proposing mitigations to this problem, the fundamental issue may not be solved by digital architectures (GPUs, CPUs, TPUs) because of physical and computational limitations of modern neural networks designs.

Aspects of this disclosure relate to improved neural network designs, which may be referred to as a MemComputing Neural Network (MEMC-NN) or more generally as digital neural networks. Digital neural networks disclosed herein can be implemented by circuits. In certain embodiments, the disclosed neural networks can be easily integrated on a chip using only logic gates, switches, and/or selectors. Aspects of this disclosure can partially or completely address some or all of the limitations described above, and thereby provide a real-time neural network evaluation/inference while using negligible power. The neural network solutions provided herein can be integrated virtually at all levels in systems, from servers and the cloud to smaller devices like smart watches and glasses, or internet of things (IOT) and edge computing such as those described herein. Advantageously, aspects of this disclosure have the potential to deliver unprecedented AI processing capabilities that adhere to size, weight, and power; environment; and cost objectives. The digital neural network systems and methods disclosed herein can be applied to any other suitable applications and/or meet any other suitable objectives.
Embodiments of the Digital Neural Network Design FIG. 1 is a circuit diagram illustrating a digital neural network 100 in accordance with aspects of this disclosure. The digital neural network 100 can be implemented as a circuit formed on a single chip. The digital neural network 100 is a deep neural network comprising a plurality of inputs 102, a plurality of layers 104, a plurality of outputs 106, and an optional training circuit 111. Each of the layers 104 comprises a plurality of multi-terminal logic gates 108 (also referred to as "logic gates"). Each multi-terminal logic gate 108 can be logically associated with one or more of the multi-terminal logic gates 108 in the previous layer 104. For example, the logical association between two multi-terminal logic gates 108 can apply a logical operation to the output of the multi-terminal logic gate 108 from the previous layer 104 before providing the result of the logical operation to the multi-terminal logic gate 108 of the current layer 104. These logical associations can be implemented by logical connectors 110 (which may also be referred to as "logical operators", "binary logic operators", or "logical circuits").

Figure 2:
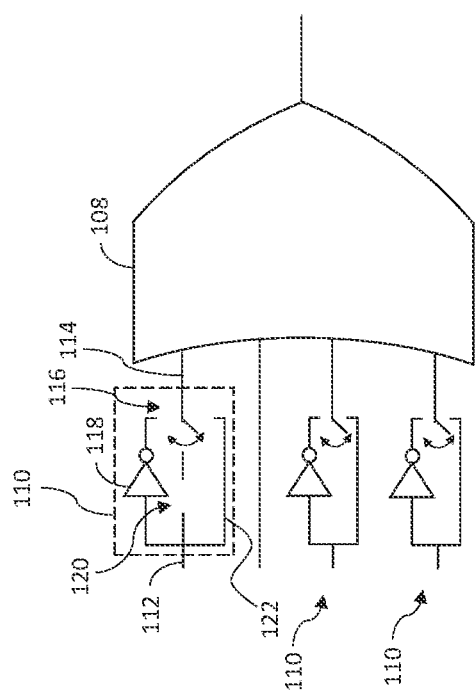
FIG. 2 illustrates an embodiment of a multi-terminal logic gate and a plurality of logical connectors connected thereto in accordance with aspects of this disclosure.
Figure 3:
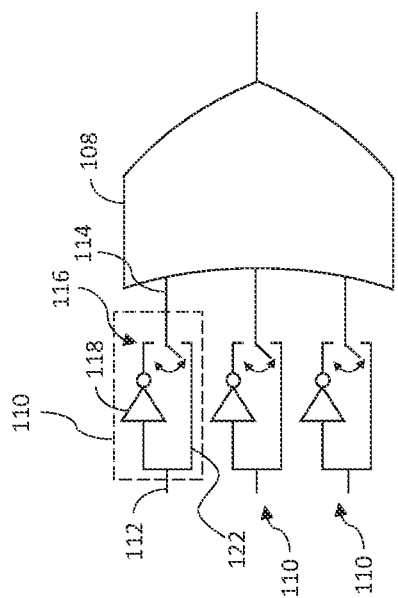
FIG. 3 illustrates another embodiment of a multi-terminal logic gate and a plurality of connected logical connectors connected thereto in accordance with aspects of this disclosure.

Each of the logical connectors 110 is configured to define a relationship between a pair of multi-terminal logic gates 108. The logical connectors 110 may not always physically connect logic gates. For example, the logical connectors 110 can implement an open circuit between two multi-terminal logic gates 108. As shown in FIGS. 2 and 3 and discussed in more detail below, the relationship between two multi-terminal logic gate 108 can include a logical NOT (e.g., implemented via an inverter 118), an open circuit 120, and/or a short circuit 122, although other relationships are also possible.

In certain embodiments, the logical connectors 110 can receive a single input and output a single output. In certain embodiments, the topology of the connectivity implemented by the logical connectors 110 defines the network layer of the digital neural network 100, e.g., fully connected, convolutional, pooling, etc.

The optional training circuit 111 can be used to train the digital neural network 100. Depending on the embodiment, the optional training circuit 111 may be included as part of the same chip as the digital neural network 100 or may be implemented on a separate chip. The digital neural network 100 can be trained to implement a function as disclosed herein. After the digital neural network 100 is trained, it can compute the function for a given input in a single clock cycle, a few clock cycles, a single digit number of clock cycles. For example, the digital neural network 100 can be configured to compute the function in less than two, three, four, five, six, seven, eight, nine, or ten clock cycles, or a few depending on the implementation.

FIG. 2 illustrates an embodiment of a multi-terminal logic gate 108 and a plurality of logical connectors 110 connected thereto in accordance with aspects of this disclosure. In the illustrated embodiment, each of the logical connectors 110 includes an input 112, an output 114, a switch 116, and a plurality of alternate parallel paths between the input 112 and the output 114. In the top logical connection 110 illustrated in FIG. 2, the parallel paths include an inverter 118 (e.g., a NOT gate), an open circuit 120, and a short circuit 122. The switch 116 is configured to define the state (also referred to as a "logical state") of the logical connector 110 by defining a logical relationship between the input 112 and the output 114 of the logical connector 110 via one of the inverter 118, the open circuit 120, and the short circuit 122. Although FIG. 2 illustrates an open circuit 120 as a separate path to which the switch 116 can select, in certain implementations, there may not be a physical path with an open circuit 120. For example, when selecting the open circuit, the switch 116 may be disconnected from each of the inverter 118 and the short circuit 122. Thus, the logical operation applied by a given logical connector 110 may depend on the path (e.g., the inverter 118, the open circuit 120, and the short circuit 122) used to connect the input 112 and the output 114 of the logical connectors 110. Some logical connectors 110 can include two alternative parallel paths, such as an inverter and a short circuit. The bottom two logical connectors 110 of FIG. 2 illustrates such logical connectors 110. Depending on the embodiment, the digital neural network 100 may include logical connectors 110 having substantially the same structure, or the digital neural network 100 may include a plurality of logical connectors 110 having different structures such as the logical connectors 110 shown in FIG. 2. Thus, in various embodiments the logical connectors 110 used for a particular application may be homogeneous or heterogeneous.

In addition, in the example of FIG. 2, the multi-terminal logic gate 108 is embodied as a multi-terminal OR gate. However, aspects of this disclosure are not limited thereto and the multi-terminal logic gate 108 can be embodied using other types of multi-terminal logic gates 108 depending on the implementation. As described in more detail herein, the states of the logical connectors 110 may be analogous to the weights of a traditional neural network. In some other embodiments, each of the logical connectors 110 can be implemented using only a single path (e.g., one of the inverter 118, the open circuit 120, and the short circuit 122) without the switch 116 representing the trained state of the logical connector 110 as described herein.

FIG. 3 illustrates another embodiment of a multi-terminal logic gate 108 and a plurality of connected logical connectors 110 connected thereto in accordance with aspects of this disclosure. The embodiment of FIG. 3 is similar to that of FIG. 2 except the logical connectors 110 do not include an open circuit 120 path. While FIGS. 2 and 3 provide example embodiments of the logical connectors 110, aspects of this disclosure are not limited thereto and the logical connectors 110 can include a greater number of logical states implementing one or more different logical operations.

Universality of a Digital Neural Network

As used herein, a neural network may function as a universal machine if the neural network can compute any computable function in the Turing sense. A computable function can be defined as a function that can be computed by a Turing machine. The digital neural networks 100 embodied in FIGS. 1-3 can be used to create a universal machine. In fact, OR gates together with NOT gates (e.g., inverters) can form a complete basis in the sense that any Boolean function can be written as a collection of OR and NOT gates.

While the digital neural networks 100 described herein are not limited to the configurations illustrated in FIGS. 1-3, the digital neural networks 100 of FIGS. 1-3 are able use any basis of Boolean functions or a mixture of them to create layers allowing for large flexibility. The universality of the digital neural networks 100 described herein can also be viewed from an operative point of view. Given N input terminals and M output terminals, there is a minimum number of layers (dependent on the topology of the connectivity) that allows the computation of any possible function $y=f(x)$ for any input x of length N and binary output y of length M. The states of the logical connectors 110 can be used to implement the function f. In other words, for each function f there is at least one set of states of the logical connectors 110 that configures the digital neural network 100 to exactly evaluate the function f.

Training a Digital Neural Network

As used herein, training a digital neural network 100 generally refers to finding the configuration(s) of logical states for the logical connectors 110 that maps a function f into the digital neural network 100. This training may be performed without either an analytical knowledge of the function f or the outcomes y for all possible inputs x. Typically, a set of data outcomes y (labels) for given inputs x (training set) is available for training. The training circuit 111 can perform training to train the digital neural network 100.

For traditional neural networks, gradient descent-based techniques can be used to find the configuration of the weights that allows for a good representation of the function f. However, such techniques may not be applicable to training the digital neural networks 100 described herein since there are an integer number of available states for the logical connectors 110 and therefore it may not be possible to define a gradient for the logical connectors 110. This is one reason that it has been difficult to implement fully digital neural networks.

Various typical training methods for neural networks can encounter technical challenges for training digital circuits. In such typical training methods, continuous parameters are used for training. However, digital circuits can function based on binary values rather than continuous parameters. Methods that work on continuous parameter values are generally not well suited for digital circuits that use binary values.

Training digital neural networks 100 disclosed herein can involve determining associations (e.g., as defined by the digital neural network 100) between logic gates 108 in different layers of a neural network 100. For example, this can involve determining whether to connect logic gates 108 in different layers via a short circuit 122 or via an inverter 118. As another example, training can involve determining whether to connected logic gates 108 in different layers via a short circuit 122 or via an inverter 118 or to not connect the two logic gates 108 (e.g., by connecting an open circuit 120 to an input of one of the logic gates 108).

One technique for training the neural networks 100 disclosed herein involves casting the training problem using integer linear programming (ILP). For example, for each input x, a set of linear inequalities, where the binary variables representing the states of the logical connectors 110 are the unknowns, can be defined to represent the propagation of the input x through the neural network 100. Therefore, the training of a digital neural network 100 can be translated into solving an ILP problem.

However, solving ILPs may not be a simple task. ILPs belongs to the class of combinatorial problems also known as non-deterministic polynomial (NP) problems, infamous for their hardness. This disclosure is related to the Virtual Memcomputing Machine (VMM), where non-transitory computer readable storage stores instructions that, when executed by one or more processors, emulate a novel computing architecture and solves large ILP problems very efficiently. The VMM can be used to solve the ILP problem related to training digital neural networks 100 and provide a configuration for the logical connector 110 states that represents the function f. The VMM can be a software emulation of Self-Organizing Algebraic Gates (SOAGs), which can be used as a training solution for digital neural networks 100.

Any suitable principles and advantages disclosed in International Patent Application No. PCT/US2022/053781 filed Dec. 22, 2022 and/or International Patent Application No. PCT/US2016/041909 filed Jul. 12, 2016 and published as International Publication No. WO 2017/011463 can be used to solve problem (e.g., an ILP problem) related to training any of the neural networks disclosed herein, the disclosures of each of these patent applications are hereby incorporated by reference in their entireties and for all purposes. For instance, the training circuit 111 can be implemented in accordance with any suitable principles and advantages disclosed in these international patent applications. Any other suitable training methods can be applied to the digital neural networks disclosed herein.

Digital neural networks disclosed herein can be trained multiples times to compute different functions. In certain applications, digital neural networks disclosed herein can be trained a single time. This can be useful for certain applications, such an Internet of Things devices.

Design of NOR Gates as Activation Functions

In certain embodiments, NOR gates can be used to implement the multi-terminal logic gates 108 of a digital neural network 100. A multiterminal NOR gate can be defined with a threshold having a general relation as follows:

$$o = \begin{cases} 0 \text{ if } \sum_j i_j > th \\ 1 \text{ if } \sum_j i_j \le th \end{cases} \quad \text{(Equation 1)}$$

In Equation 1, o is the output and $i_j$ is the j–th input of the NOR gate and th is the threshold. In certain implementations, a NOR gate can be used to implement a multi-terminal logic gate 108 instead of an OR gate because NOR gates can be easily implemented in complementary metal-oxide semiconductor (CMOS) technology. However, aspects of this disclosure are not limited thereto. To obtain an OR gate, a NOT gate can be added after a NOR gate. However, when used in certain embodiments of the digital neural networks 100 described herein, OR and NOR gates may be completely interchangeable because the input terminals of the multi-terminal logic gates 108 can be coupled to logical connectors 110 which can include switches 116 that can select the inverter 118 or the short circuit 122 (e.g., as shown in FIG. 3).

Figure 4:
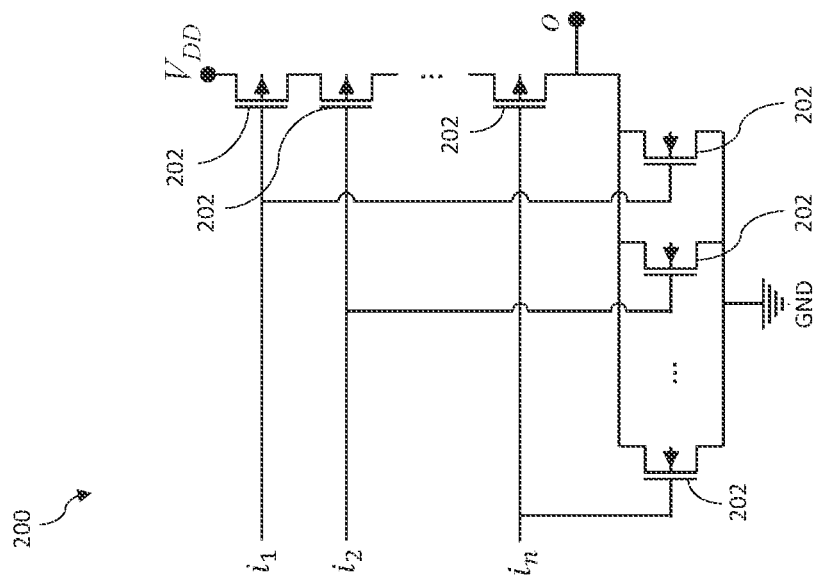
FIG. 4 illustrates an embodiment of a multi-terminal NOR gate in accordance with aspects of this disclosure.
Figure 5:
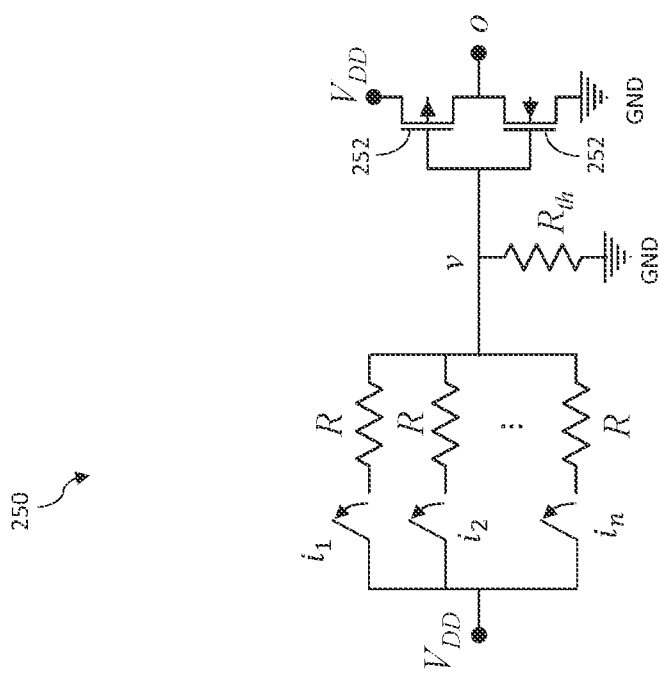
FIG. 5 illustrates an embodiment of a multi-terminal NOR gate having a threshold in accordance with aspects of this disclosure.

FIG. 4 illustrates an embodiment of a multi-terminal NOR gate 200 in accordance with aspects of this disclosure. FIG. 5 illustrates an embodiment of a multi-terminal NOR gate 250 having a threshold in accordance with aspects of this disclosure. Each of the multi-terminal NOR gates 200 and 250 can be implemented in CMOS technology.

With reference to FIG. 4, the multi-terminal NOR gate 200 includes a plurality of inputs $i_1, i_2, \ldots i_n$, an output o, a first power supply terminal $V_{DD}$, a second power supply terminal GND, and a plurality of transistors 202. The transistors 202 are arranged to implement a NOR function.

In FIG. 5, the multi-terminal NOR gate 250 includes a plurality of input switches $i_1, i_2, \ldots i_n$, an output o, a first power supply terminal $V_{DD}$, two second power supply terminals GND, a pair of transistors 252, a plurality of first resistors R each in series with a respective input switch $i_1, i_2, \ldots i_n$, and a threshold resistor $R_{th}$. When the threshold resistor $R_{th}$ is set to R/2 or any larger value, the functionality of the multi-terminal NOR gate 250 of FIG. 5 may be substantially the same as that of the multi-terminal NOR gate 200 of FIG. 4. The working principle of the NOR gate 250 can be as follows. The resistor $R_{th}$ can be sized such that if a number of switches strictly larger than th is closed, then the output voltage o is set to 0 otherwise to $V_{DD}$. Accordingly, NOR gate 250 implements Equation 1 where the state of the switches are the inputs $i_j$ and the output o is the voltage at the node o.

The multi-terminal NOR gate 250 of FIG. 5 can be implemented using a combination of digital and analog circuit elements, even when implemented fully in CMOS technology. This can provide certain advantages over fully digital implementations in certain applications, for example, as discussed herein.

With continuing reference to the multi-terminal NOR gate 250 of FIG. 5, the inputs are configured to open or close the inputs switches $i_1, i_2, \ldots i_n$. The input switches $i_1, i_2, \ldots i_n$ are configured to be opened or closed by applying a voltage to a control terminal of a respective transistor (e.g., a gates of the CMOS components) used to implement the input switches $i_1, i_2, \ldots i_n$. Therefore, the input switches $i_1, i_2, \ldots i_n$ can be controlled directly by the outputs of other NOR gates 250 or other generic CMOS based logic gates. The implementation of FIG. 5 may be one of the most compact implementations for a NOR gate with a threshold. For example, the FIG. 5 implementation may use a minimum of 3(n+1) transistors with n being the number of inputs. A fully digital implementation may involve a more complex digital circuit that would essentially perform the sum of the inputs and compare the sum against a threshold.

Depending on the implementation, the magnitude of resistance of the resistor $R_{th}$, or the ratio $R/R_{th}$ may be a significant design consideration to implement the desired functionality of the NOR gate 250. For example, standard CMOS transistors may have a cut-off gate voltage at $V_{DD}/2$. In this case, the ratio may be configured such that $$\frac{R}{R_{th}} = \frac{1}{2} + th$$

to have the NOR gate 250 function properly. In one example, if th switches are closed, the voltage v is $$v = \frac{4th}{4th+1}\frac{V_{DD}}{2} < \frac{V_{DD}}{2}$$

while th+1 switches are closed then $$v = \frac{4th+4}{4th+3}\frac{V_{DD}}{2} > \frac{V_{DD}}{2}.$$

Figure 6:
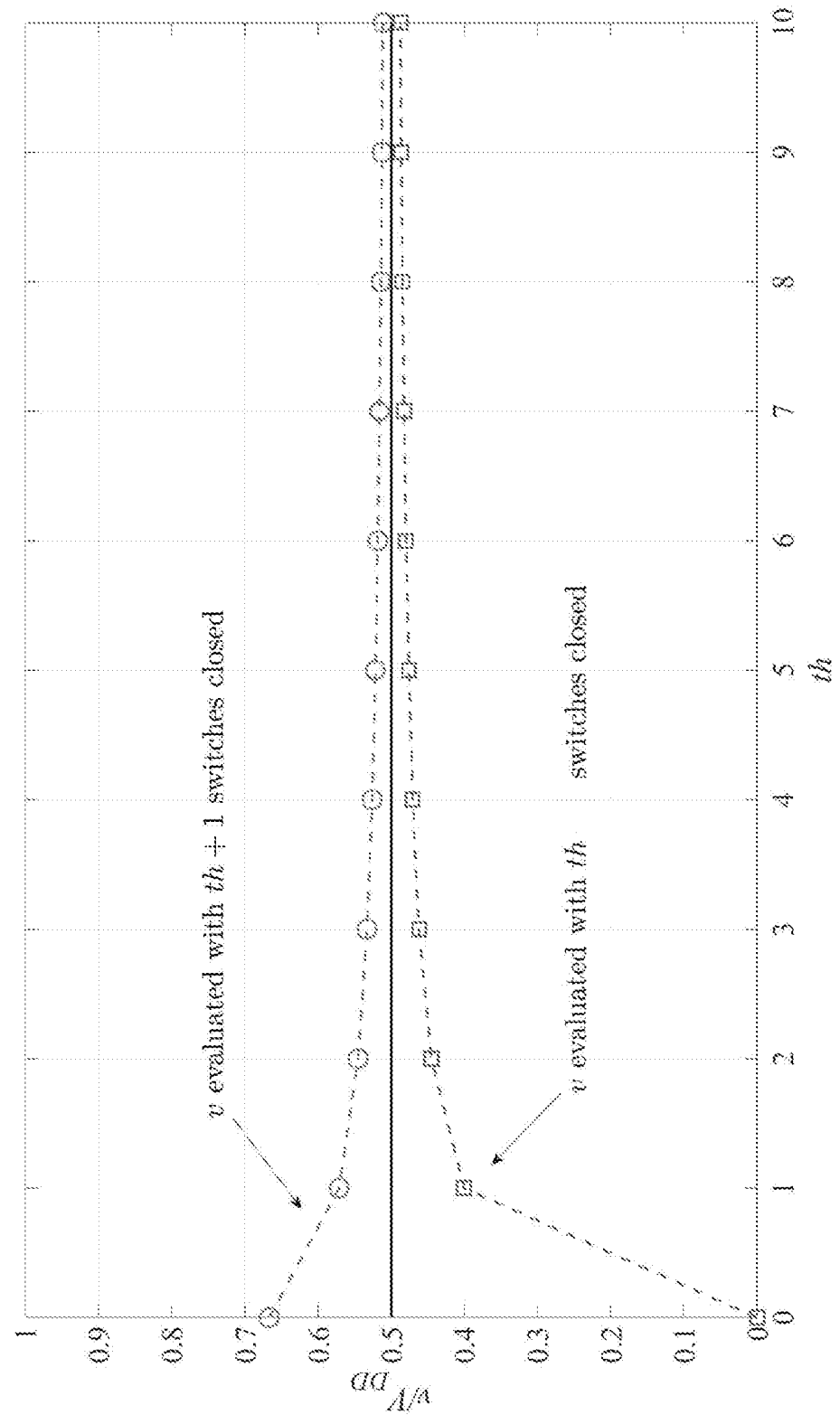
FIG. 6 is a graph of $v/V_{DD}$ evaluated with th and th+1 switches closed in accordance with aspects of this disclosure.

FIG. 6 is a graph of $v/V_DD$ evaluated with th and th+1 switches closed in accordance with aspects of this disclosure. Here, th may be a parameter that characterizes the multi-terminal NOR gate 250. Th may be a threshold number of inputs that can be asserted in a logic 1 state for the output of the multi-terminal NOR gate 250 to be at logic 1. For example, th may characterize the multi-terminal NOR gate 250 as defined in Equation 1: where if up to th inputs are 1 (e.g., up to th switches are closed) then the output 1. Otherwise if th+1 or more inputs are 1 (e.g., th+1 switches or more are closed) then the output is 0. Accordingly, the multi-terminal NOR gate 250 with the parameter th may be a generalization of a multi-terminal NOR gate. A standard multi-terminal NOR gate can be achieved by setting th=0.

However, when implemented in CMOS technology, there may be variability in the resistances and the NOR gate 250 may not follow a perfect step function. As shown in FIG. 6, if the threshold is small, th≤2, the gap $$\frac{v(th+1)-v(th)}{V_{DD}}$$

is about 10%, which is enough to handle the variabilities mentioned. This relationship may not depend on the number of inputs of the NOR gate 250. However, if the threshold is higher, then the variability may be an inherent aspect of the NOR gates 250 and which can be addressed in a different way in the training of the digital neural network 100.

ILP Formulation of NOR Gates

According to aspects of this disclosure, a digital neural network 100 that includes logic gates 108 and/or threshold logic gates 250 can be trained using an ILP formulation. Starting from Equation 1 for output o above, the ILP formulation of a multi-terminal NOR gate 250 with threshold can be written as a pair of inequalities of the form:

$$\begin{cases} \sum_{j=1}^{n} i_j \geq (th+1)(1-o) \\ \sum_{j=1}^{n} i_j \leq th + (1-o)(n-th) \end{cases} \quad \text{(Equation 2)}$$

In Equation 2, $i_j$ are the n inputs, o is the output and th the threshold. These two inequalities can be used to describe completely the multi-terminal NOR gates 250 with threshold in the ILP format. To address possible variability coming from CMOS implementation of such multi-terminal NOR gates 250, the NOR relation can be implemented with an extra gap $\delta^+$ above and $\delta^-$ below the ratio $v/V_{DD}$. In terms of ILP formulations this changes Equation 2 into:

$$\begin{cases} \sum_{j=1}^{n} i_j \geq (th+\delta^+ +1)(1-o) \\ \sum_{j=1}^{n} i_j \leq th-\delta^- + (1-o)(n-th+\delta^-) \end{cases} \quad \text{(Equation 3)}$$

Equation 3 forbids $\Sigma_{j=1}^n i_j$ to be $th-\delta^- < \Sigma_{j=1}^n i_j \leq th+\delta^+$ creating a gap of $\delta^+$ above and $\delta^-$ below the threshold th. This, properly sized, can be used to compensate the variability introduced by the CMOS implementation.

ILP Formulation of Training Problem

Figure 7:
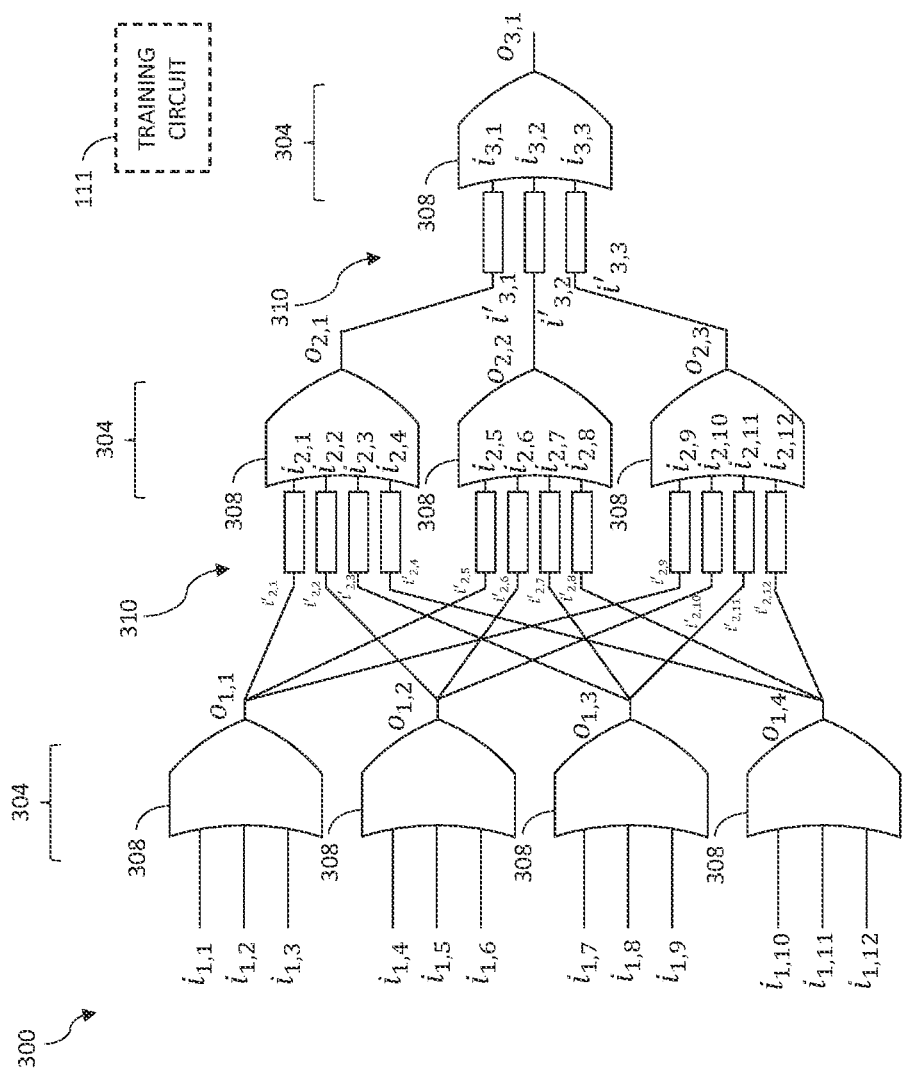
FIG. 7 illustrates an example neural network in accordance with aspects of this disclosure.

FIG. 7 illustrates an example of digital neural network 300 in accordance with aspects of this disclosure. The digital neural network 300 of FIG. 7 is provided as an example with a topology that is simple and small in order to described and capture aspects of the ILP formulation of the training problem that can be applied to a digital neural network 100 of any size and topology. As shown in FIG. 7, the neural network 300 includes a plurality of multi-terminal logic gates 308 arranged into a plurality of layers 304. The neural network 300 also includes a plurality of inputs $i_{1,1}$, $i_{1,2}, \ldots, i_{1,12}$ and an output $o_{3,1}$. The neural network 300 further includes a plurality of logical connectors 310 with states that define the relationships or connections between adjacent layers 304. Also shown are internal outputs $o_{1,1}$, $o_{1,2}, \ldots o_{2,3}$, internal inputs $i_{2,1}, i_{2,2}, \ldots, i_{3,3}$ to the multi-terminal logic gates 308, and internal inputs $i'_{2,1}, i'_{2,2}, \ldots, i'_{3,3}$ to the logical connectors 310 that connect each of the layers 304 to its adjacent layer(s) 304. The neural network 300 can further include an optional training circuit 111.

Figure 8B:
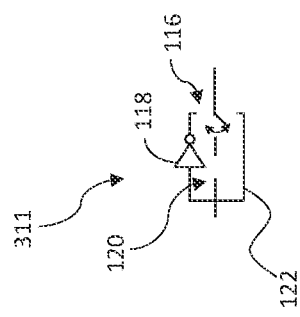
FIGS. 8A and 8B illustrate embodiments of the logical connectors in accordance with aspects of this disclosure.
Figure 8A:
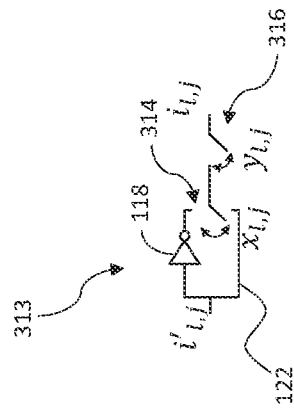

FIGS. 8A and 8B illustrate embodiments of the logical connectors in accordance with aspects of this disclosure. In particular, the logical connector 311 of FIG. 8A is substantially similar to the logical connectors 110 illustrated in FIG. 2. The logical connector 311 includes a switch 116, an inverter 118, an open circuit 120, and a short circuit 122.

The logical connector 313 of FIG. 8B implements the same functionality as the logical connector 311 of FIG. 8A with an alternative design. In particular, the logical connector 313 includes an inverter 118, a short circuit 122, a first switch 314, and a second switch 316. The first switch 314 is configured to select (e.g., connect to) one of the inverter 118 and the short circuit 122 while the second switch 316 is configured to operate in either an open circuit or short circuit state. Accordingly, the combination of the first switch 314 and the second switch 316 can implement three different states for the logical connector 313 (e.g., an open circuit, a closed circuit, or an inversion).

One significant aspect to training the neural network 300 is identifying the variables of the ILP problem. The training involves finding the set of states of the logical connectors 310 at the input terminals of each of the multi-terminal logic gates 308 such that for a set of inputs {I}, the neural network 300 will returns outputs {$\overline{O}$}. Therefore, for each I∈{I}, the propagation of the input I through the neural network 300 can be defined by a set of inequalities that link I to $\overline{O}$∈{$\overline{O}$} through the states of the logical connectors 310. The following discussion applies to an implementation in which the multi-terminal logic gates 308 are embodied as NOR gates. However, the principles and advantages of this discussion can be modified to apply equally to OR gate embodiments or any other suitable implementation of the multi-terminal logic gates 308.

For example, the binary variables $x_{l,j} \in \{0,1\}$ can describe the partial state of the j–th logical connector 313 of the layer l. If $x_{l,j}=1$, then the logical connector 310 is in a first state (e.g., the first switch 314 is connected to the inverter 118). If $x_{l,j}=0$ then the logical connector 313 is in a second state (e.g., the first switch 314 is connected to the short circuit 122). For the binary variables $y_{l,j} \in \{0,1\}$ describing the complementary partial state of the j–th logical connector 313 of the layer l, if $y_{l,j}=1$ then the logical connector has a third state (e.g., the second switch 316 implements an open circuit). If $y_{l,j}=0$ then the logical connector 313 has a state that depends on $x_{l,j}$ (e.g., that depends on the state of the first switch 314). Therefore, the states of the logical connector 313 at the input terminals of the multi-terminal logic gates 308 can satisfy the following set of inequalities:

$$\begin{cases} i_{l,j} \le y_{l,j} \\ i_{l,j} \ge x_{l,j} - i'_{l,j} - (1 - y_{l,j}) \\ i_{l,j} \ge i'_{l,j} - x_{l,j} - (1 - y_{l,j}) \\ i_{l,j} \le 2 - i'_{l,j} - x_{l,j} \\ i_{l,j} \le i'_{l,j} + x_{l,j} \end{cases} \quad \text{Equation (4)}$$

In Equation 4, $i_{l,j}$ is the input that is applied to the input terminal of the multi-terminal logic gate 308 and $i'_{l,j}$ is the input that is applied to the logical connector 313. The set of inequalities in Equation 4 may fully describe the state of the logical connectors 313 in the neural network 300.

The training process through an ILP can be described based on the set of inequalities in Equation 4. For example, for I∈{I}, the inputs $i_{1,1}, \ldots, i_{1,12}$ are set equal to the components of I. The outputs of the first layer $o_{1,1}, \ldots, o_{1,4}$ are subsequently evaluated. The inputs $i_{1,1}, \ldots, i_{1,12}$ and outputs $o_{1,1}, \ldots, o_{1,4}$ of the first layer 304 do not involve any logical connectors 313, and thus, the inputs $i_{1,1}, \ldots, i_{1,12}$ and outputs $o_{1,1}, \ldots, o_{1,4}$ are parameters that will enter in the next equations. For the second layer 304, the first multi-terminal gate 308 will be described in detail, since the remaining multi-terminal gate 308 operate similarly. The inputs $i'_{2,1}, \ldots, i'_{2,4}$ can be set as $o_{1,1}, \ldots o_{1,4}$ since the inputs $i'_{2,1}, \ldots, i'_{2,4}$ are directly connected to the output $o_{1,1}, \ldots, o_{1,4}$. The inputs $i'_{2,1}, \ldots, i'_{2,4}$ can be linked to the inputs $i_{2,1}, \ldots, i_{2,4}$ using the inequalities (4) through the states of the logical connectors 313 $x_{2,1}, \ldots, x_{2,4}$ and $y_{2,1}, \ldots, y_{2,4}$. That output $o_{2,1}$ on the multi-terminal gate 308 can be linked to the inputs $i_{2,1}, \ldots, i_{2,4}$ using Equation 3 as:

$$\begin{cases} \sum_{j=1}^{4} i_{2,j} \ge (th + \delta^+ + 1)(1 - o_{2,1}) \\ \sum_{j=1}^{4} i_{2,j} \le th - \delta^- + (1 - o_{2,1})(n - th + \delta^-) \end{cases} \quad \text{(Equation 5)}$$

A similar process can be used for the last multi-terminal gate 308 where the outputs of the second layer $o_{2,1}, \ldots, o_{2,3}$ are linked to the inputs of the logical connectors 313 $i'_{3,1}, \ldots, i'_{3,3}$ that in turn is linked to the inputs of the multi-terminal gate 308 $i_{3,1}, \ldots, i_{3,3}$ through the inequalities (4) and finally the inputs of the multi-terminal gate 308 can be linked to the output $o_{3,1}$ through the inequalities (4). The output $o_{3,1}$ is set as $\overline{O} \in \{\overline{O}\}$ which corresponds to the input I∈{I}.

Therefore, for each pair (I, $\overline{O}$), the training process can involve generating the set of ILP inequalities that propagates the inputs through the neural network 300 and at the same time backpropagates the outputs through the neural network 300. For example, because the layers 304 of the neural network 300 are linked by the inequalities (4), both the outputs from a previous layer 304 and the inputs to a subsequent layer 304 will affect the states of the logical connectors 313 connecting a current layer 304 to the previous and subsequent layers 304. Therefore, solving the ILP for all pairs (I, $\overline{O}$) simultaneously, the training process will return the configurations of the logical connectors 313 that reproduces the function $\overline{O}=\overline{O}(I)$. For large neural networks 300, instead of generating an extremely large ILP problem, a minibatch method can be employed to solve subsets of randomly extracted pairs (I, $\overline{O}$) and iterate the process in several epochs until the training process reaches a threshold accuracy.

Applications

The adoption of neural networks for data mining, image recognition and signal recognition, among other applications, is driving this growth in the neural network market, as there is a need to detect complex nonlinear relationships between variables and patterns. Indeed, there is a great need for more efficient, lower energy digital neural network architectures to support current and future computing endeavors.

There are great commercial applications across a variety of industries (e.g., fintech, i.t., life sciences, manufacturing, government and defense, transportation logistics). The adoption of cloud-based training and edge deployment of digital neural network solutions is expected to grow, mainly due to their benefits, such as easy maintenance of generated data, cost-effectiveness, scalability, and effective management. The digital neural networks described herein have serious potential to disrupt this market and deliver strategic competitive advantages to its early adopters.

Evaluation of a Digital Neural Network

Using the training to find a configuration of the logical connectors 110 that maps the function f into the digital neural network 100, the digital neural network 100 can be programmed such that the states of the logical connectors 110 (e.g., the states of the switch 116) are set following the training outcome. In implementation in which the digital neural network 100 can be retrained, updates of the training of a digital neural network 100 can be implemented by simply reprogramming the states the switch 116. This can allow for, for example, offline training if more labelled data is available and a simple reconfiguration of the switches 116 to implement updates. Once the switches 116 are set, the digital neural network 100 is ready to be evaluated for any possible input x. By design, the evaluation of the digital neural network 100 can be performed in a single clock cycle. Moreover, using CMOS technology to design the multi-terminal logic gates 108, the power and energy for the evaluation is extremely small, orders of magnitude smaller than current neural networks. In fact, since there is no data movement from the memory (just bringing the input and returning the output) to the processing unit (e.g., the digital neural network 100), the CMOS technology allows for an extremely low power multi-terminal logic gate 108 implementation.

Theoretical aspects and practical performance of a digital neural network 100 can be analyzed against established benchmarks. Size in terms of gates, transistors, and interconnect complexity for specific applications (e.g., classification, predictive analytics, image recognition, etc.) can be quantified. To this end, for a given topology and input and output sizes, a minimum number of layers for achieving and/or guaranteeing universality can be determined. Efficiency of the training in terms of accuracy measured on established benchmarks can be assessed. In order to efficiently train the digital neural network 100, a Virtual Mem-computing Machine can be used. In some embodiments, training can be performed with the full training set as well as using mini-batches to reduce the size of ILPs to be solved since this may allow for speedup for the training under certain conditions. Performance in terms of energy/power and speed can be evaluated. This can be evaluated by considering a realization in CMOS technology.

Trained Digital Neural Networks

As discussed herein, a digital neural network 100 can be trained by solving a first set of ILP problems to determine a first set of states of the logical connectors 110 that maps a first function $f_1$ into the digital neural network 100. The digital neural network 100 can also retrained to map a second function $f_2$ into the digital neural network 100 by determining a second set of states of the logical connectors 110 by solving a second set of ILP problems corresponding to the second function $f_2$. Thus, the digital neural network 100 can be retrained to implement substantially any function f by generating the corresponding set of ILP problems.

However, for certain applications it may not be necessary to retrain a digital neural network 100. For example, when a digital neural network 100 is designed to implement a single function f, it may not be necessary to ever retrain the digital neural network 100. Accordingly, it is not necessary to include each of the parallel paths (e.g., the inverter 118, the open circuit 120, and the short circuit 122 of FIG. 2) or the switch 116 in each of the logical connectors 110. For example, if the trained state of a given logical connector 110 is the inverter 118 path, then the logical connector 110 can include only the inverter 118 without any of the other components. By implementing the logical connectors 110 with only the component corresponding to the trained state of the logical connector 110, the digital neural network 100 can be implemented with a significantly fewer number of components.

In certain implementations, the digital neural network 100 may be embodied on a single chip, for example, when incorporated into certain devices (e.g., in autonomous vehicles). Since the digital neural network 100 can be implemented entirely in CMOS technology, the digital neural network 100 can be more easily implemented on a chip than other neural networks that rely on von Neumann architectures. Advantageously, this enables digital neural networks 100 to be more readily adopted for various different applications compared to traditional neural networks.

The digital neural networks disclosed herein can provide fast computations. A digital neural network can be embodied on a single chip. In certain instances, an input can be loaded, the digital neural networks can compute a function in a single clock cycle, and the output can then be read out. This is a significant improvement in speed relative to certain existing neural network function computations. Digital neural networks disclosed herein can also use little energy compared to certain existing neural network computations.

Conclusion

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including," "comprising," "incorporating," "consisting of," "have," "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A neural network circuit, comprising:
a plurality of logic gates arranged into a plurality of layers, each of the logic gates having a plurality of inputs and an output; and
a plurality of logical connectors arranged between each pair of adjacent layers, each of the logical connectors determining a relationship between the output of a first logic gate to one of the plurality of inputs of a second logic gate, and each of the logical connectors having one of a plurality of different logical connector states,
wherein the neural network circuit is configured to be trained to implement a function by finding a set of the logical connector states for the logical connectors such that the neural network circuit implements the function, and
wherein the logical connector states include a first state in which the output of the first logic gate is connected to the input of the second logic gate via a NOT gate and a second state in which the output of the first logic gate is connected to the input of the second logic gate via a short circuit.

2. The neural network circuit of claim 1, wherein the logical connector states further include a third state in which the output of the first logic gate is connected to the input of the second logic gate via an open circuit.

3. The neural network circuit of claim 1, wherein the logic gates and the logical connectors are implemented in complementary metal-oxide semiconductor (CMOS) technology.

4. The neural network circuit of claim 1, wherein the neural network circuit is formed on a single chip.

5. A neural network circuit, comprising:
a plurality of logic gates arranged into a plurality of layers, each of the logic gates having a plurality of inputs and an output; and
a plurality of logical connectors arranged between each pair of adjacent layers, each of the logical connectors determining a relationship between the output of a first logic gate to one of the plurality of inputs of a second logic gate, and each of the logical connectors having one of a plurality of different logical connector states,
wherein the neural network circuit is configured to be trained to implement a function by finding a set of the logical connector states for the logical connectors such that the neural network circuit implements the function, and
wherein each of the logical connectors comprises:
an input;
a short circuit connected to the input;
an inverter arranged in parallel with the short circuit and connected to the input;
an output; and
at least one switch configured to connect one of the short circuit and the inverter to the output.

6. The neural network circuit of claim 5, wherein each of the logical connectors further comprises:
an open circuit connected to the input,
wherein the at least one switch configured to connect one of the short circuit, the inverter, and the open circuit to the output.

7. The neural network circuit of claim 5, wherein:
the at least one switch comprises a first switch and a second switch connected in series,
the first switch is configured to electrically connect to one of the short circuit and the inverter, and
the second switch is configured to operate in either an open circuit or short circuit state.

8. A neural network circuit, comprising:
a plurality of logic gates arranged into a plurality of layers, each of the logic gates having a plurality of inputs and an output; and
a plurality of logical connectors arranged between each pair of adjacent layers, each of the logical connectors determining a relationship between the output of a first logic gate to one of the plurality of inputs of a second logic gate, and each of the logical connectors having one of a plurality of different logical connector states,
wherein the neural network circuit is configured to be trained to implement a function by finding a set of the logical connector states for the logical connectors such that the neural network circuit implements the function,
wherein each of the logical connectors comprises at least one of a short circuit or an inverter, and
wherein each of the logical connectors connects an output of a logic gate of a previous layer to an input of a logic gate of a current layer.

9. The neural network circuit of claim 1, wherein each of the logic gates comprises a multi-terminal NOR gate.

10. The neural network circuit of claim 1, further comprising a training circuit configured to produce the set of the logical connector states.

11. The neural network circuit of claim 1, wherein each of the logical connectors has a fixed one of the logical connector states.

12. A neural network circuit, comprising:
a plurality of logic gates arranged into a plurality of layers, each of the logic gates having a plurality of inputs and an output; and
a plurality of logical connectors arranged between each pair of adjacent layers, each of the logical connectors determining a relationship between the output of a first logic gate to one of the plurality of inputs of a second logic gate, and each of the logical connectors having one of a plurality of different logical connector states,
wherein the neural network circuit is configured to be trained to implement a function by finding a set of the logical connector states for the logical connectors such that the neural network circuit implements the function,
wherein each of the logical connectors has a fixed one of the logical connector states, and wherein each of the logical connectors comprises a single one of: a short circuit, an inverter, and an open circuit corresponding to the fixed one of the logical connector states.

13. A method of computing a function using a neural network circuit, comprising:
providing a neural network circuit including:
a plurality of logic gates arranged into a plurality of layers, each of the logic gates having a plurality of inputs and an output; and
a plurality of logical connectors comprising sets of logical connectors arranged between each pair of adjacent layers, each of the logical connectors having one of a plurality of different logical connector states, wherein the plurality of logical connectors are programmed to implement a function; and
computing the function for an input signal using the neural network,
wherein the logical connector states include a first state in which the output of a first logic gate is connected to one of the plurality of inputs of a second logic gate via a NOT gate and a second state in which the output of the first logic gate is connected to the input of the second logic gate via a short circuit.

14. The method of claim 13, further comprising:
finding a set of the logical connector states for the plurality of logical connectors such that the neural network circuit implements the function.

15. A method of computing a function using a neural network circuit, comprising:
providing a neural network circuit including:
a plurality of logic gates arranged into a plurality of layers, each of the logic gates having a plurality of inputs and an output; and
a plurality of logical connectors comprising sets of logical connectors arranged between each pair of adjacent layers, each of the logical connectors having one of a plurality of different logical connector states
finding a set of the logical connector states for the plurality of logical connectors such that the neural network circuit implements a function by at least:
generating a set of integer linear programming (ILP) problems based on the function; and
solving the set of ILP problems to produce the set of the logical connector states;
programming the plurality of logical connectors such that the neural network implements the function; and
computing the function for an input signal using the neural network.

16. The method of claim 15, further comprising:
determining a set of inequalities that describe the states of the logical connectors; and
linking outputs from a previous layer to inputs of a subsequent layer through the set of inequalities,
wherein the generating of the ILP problems is based on the linking of the outputs from the previous layer to the inputs of the subsequent layer through the set of inequalities.

17. A single chip, comprising:
a plurality of logic gates arranged into a plurality of layers of a neural network circuit, each of the logic gates having a plurality of inputs and an output;
a plurality of logical connectors arranged between logic gates of each pair of adjacent layers, each of the logical connectors determining a relationship between the output of a first logic gate to one of the plurality of inputs of a second logic gate, and each of the logical connectors having one of a plurality of different logical connector states;
a plurality of input terminals; and
at least one output terminal,
wherein the chip is configured to compute a function between the input terminals and the output terminal,
wherein the chip is configured to compute the function for a given input provided to the input terminals in ten clock cycles or fewer, and wherein the logical connector states include a first state in which the output of the first logic gate is connected to the input of the second logic gate via a NOT gate and a second state in which the output of the first logic gate is connected to the input of the second logic gate via a short circuit.

18. The chip of claim 17, further comprising a training circuit configured to find a set of the logical connector states for the plurality of logical connectors such that the chip circuit implements the function.

19. The neural network circuit of claim 1, wherein the logical connector states include:
the first state in which the output of the first logic gate is negated before being provided to the input of the second logic gate,
the second state in which the output of the first logic gate is provided to the input of the second logic gate, and
a third state in which the output of the first logic gate is not provided to the input of the second logic gate.

20. The neural network circuit of claim 9, wherein the multi-terminal NOR gate comprises a plurality of input terminals and an output terminal, wherein the multi-terminal NOR gate is configured to output one of a first logic state or a second logic state based on whether a number of the input terminals having the first logic state is greater than a threshold value.

* * * * *